United States Patent Office 3,271,473
Patented Sept. 6, 1966

3,271,473
POLYMERIZATION PROCESS
Robert M. Engelbrecht, St. Louis, James M. Schuck, Webster Groves, and Robert G. Schultz, Vinita Park, Mo., assignors to Monsanto Company, St. Louis, Mo., a corporation of Delaware
No Drawing. Filed July 12, 1963, Ser. No. 294,742
12 Claims. (Cl. 260—683.15)

The present invention relates to a process for the polymerization of olefin hydrocarbons. The present invention also relates to a catalyst for the polymerization of olefin hydrocarbons and to a method of preparation for said catalyst. More particularly, the present invention relates to a catalyst, a method of preparing said catalyst and a process utilizing said catalyst whereby internally unsaturated mono-olefin hydrocarbons may be converted to low molecular weight polymers, particularly dimers.

The term "internally unsaturated" as used herein in regard to olefinic hydrocarbons refers to those unsaturated hydrocarbons wherein the double-bond point of unsaturation is located at a point within the molecule other than adjacent to a terminal carbon atom.

It is relatively well known to use activated carbon supported cobalt catalysts to polymerize certain olefin hydrocarbons. For example, it is provided in the prior art that various activated carbons containing metallic cobalt dispersed thereon may be used in polymerizing ethylene and in some instances propylene. However, when the activated carbon supported cobalt catalysts provided by the prior art are used in the polymerization of internally unsaturated mono-olefin hydrocarbons according to the processes taught by the prior art, little or no polymerization activity is obtained.

It is, therefore, an object of the present invention to provide a new and novel process for the polymerization of olefin hydrocarbons. It is also an object of the present invention to provide a new and novel catalyst for the polymerization of olefin hydrocarbons. A further object of the present invention is to provide a technique for preparing a catalyst useful in the polymerization of olefin hydrocarbons. A more specific object of the present invention is to provide a new and novel process for the polymerization of internally unsaturated mono-olefin hydrocarbons whereby substantial quantities of low molecular weight polymers, i.e., dimers are produced. Another particular object of the present invention is to provide a catalyst for the polymerization of internally unsaturated mono-olefin hydrocarbons whereby substantial quantities of low molecular weight polymers, i.e., dimers, are produced. Yet, another particular object of the present invention is to provide a technique for the preparation of a new and novel catalyst useful in the polymerization of internally unsaturated mono-olefin hydrocarbons whereby substantial quantities of low molecular weight polymers, i.e., dimers, are produced. Additional objects will become apparent from the following description of the invention herein disclosed.

In fulfillment of these and other objects, it has been found that when internally unsaturated mono-olefin hydrocarbons are subjected to polymerization conditions in the presence of a catalyst comprised of cobalt oxide supported on an activated carbon, said catalyst having been activated in a non-oxidizing atmosphere at a temperature of 400° C. to 575° C., substantial quantities of the low molecular weight polymers, i.e., dimers, of the internally unsaturated mono-olefin hydrocarbons are obtained.

The term "dimer" as used herein refers to those polymers obtained by the condensation of two and only two molecules or monomer units of mono-olefinic hydrocarbons. These molecules or monomer units may be like or unlike. For example, dodecenes produced by the condensation of two hexene-2 molecules or the condensation of a butene-2 molecule and an octene-2 molecule are equally within the meaning of the term "dimer" as used herein.

In order to further describe and to demonstrate the present invention, the following examples are presented. It is understood, of course, that these examples are in no manner to be construed as limiting the present invention.

Example I

Two catalysts were prepared in the same manner with the exception of the activation temperatures. Both catalysts were prepared by immersing approximately 100 grams of a previously dried commercial grade (BPL) activated carbon in a solution of approximately 58.3 grams of cobalt nitrate hexahydrate dissolved in 100 mls. of demineralized water. Excess water was removed and the impregnated catalysts dried at a low heat for approximately 3 hours until there was no visible liquid on the catalyst mass. The catalysts were then placed under vacuum at 125° C. for 16 hours. One of the catalysts, hereinafter designated Catalyst A, was then activated in the presence of nitrogen and at 35 mm. Hg at a temperature of 450° C. The second catalyst, hereinafter referred to as Catalyst B, was also activated in the presence of nitrogen and at 35 mm. Hg, but at a temperature of 275° C. The amount of cobalt present in the catalysts was approximately 11 weight percent.

Example II

The two catalysts prepared in Example I above were tested for their polymerization efficacy in the following manner: Approximately 2.5 grams of catalyst was placed in a sealed container with approximately 68 grams (100 ml.) of hexene-2. The temperature was raised to 150° C. and maintained at that point for 12 hours. The pressure was initially atmospheric, but was allowed to rise autogenously within the sealed container. At the end of the reaction period the product was recovered. The table below presents the weight percent of dimer produced by each of the catalysts.

| Catalyst: | Amount of dimer produced, percent |
|---|---|
| A | 9.4 |
| B | None |

Example III

Two catalysts were prepared in the same manner with the exception of the activation temperatures. Both catalysts were prepared by immersing approximately 1,000 grams of a commercial grade (BPL) activated carbon in approximately 2100 mls. of a solution of 600 mls. of concentrated nitric acid in 1500 mls. of water. After approximately 120 minutes, excess acid solution was decanted from the carbon and the activated carbon then water washed seven times and then treated with 250 mls. of ammonium hydroxide dissolved in 2 liters of water. The activated carbon was then water washed two additional times and then dried for 16 hours at 130° C. under a slight vacuum. About 60 grams of the dried activated carbon was immersed in a solution of approximately 35 grams of cobalt nitrate hexahydrate dissolved in 65 mls. of demineralized water. Excess water was removed and the impregnated catalyst dried at a low heat for approximately 3 hours until there was no visible liquid on the catalyst masses. The catalysts were then placed under vacuum at 125° C. for approximately 16 hours. One of the catalysts, hereinafter designated as Catalyst A, was then activated in the presence of nitrogen at 35 mm. Hg, and at a temperature of 450° C. The second catalyst, hereinafter referred to as Catalyst B, was also activated in the presence of nitrogen at 35 mm. Hg, at a temperature of 275° C.

Example IV

The two catalysts prepared in Example III above were tested for their polymerization efficacy in the same manner and under the same conditions as were set out in Example II above. The table below presents the weight percent of dimer produced by each of the catalysts.

| Catalysts: | Amount of dimer produced, percent |
| --- | --- |
| A | 9.4 |
| B | None |

Consideration of the above examples clearly demonstrates the criticality of the activation temperatures of the cobalt oxide on activated carbon catalysts of the present invention. In both instances in which the catalysts were activated at temperatures below the activation temperatures claimed herein no dimer product has produced.

As previously stated, the present invention provides a process for the production of low molecular weight polymers, i.e., dimers, from internally unsaturated mono-olefin hydrocarbons. The feed stocks in the present invention, thus, are primarily internally unsaturated mono-olefin hydrocarbons. These mono-olefin hydrocarbons include those containing from 4 to 20 carbon atoms and higher. Most often, however, the present invention will find its greatest utility in the polymerization of internally unsaturated mono-olefin hydrocarbons of 4 to 10 carbon atoms. These mono-olefin hydrocarbons may be either straight-chain or branched-chain. When branched-chain, it would generally be preferred that there be no greater than one substituent to the primary chain and that the substituent be a methyl group. Among the olefin hydrocarbons useful in the present invention are the following non-limiting examples: 2-butene, 2-pentene, 2-hexene, 3-hexene, 3-methyl-2-pentene, 4-methyl-2-pentene, 2-heptene, 3-heptene, 3-methyl-2-hexene, 5-methyl-3-hexene, 2-octene, 3-octene, 4-octene, 2-methyl-3-pentene, 2-nonene and the like, on up to and including such olefins as 2-eicosene.

Though the present invention has for its purpose the dimerization of internally unsaturated mono-olefin hydrocarbons, it is not specifically limited to feedstocks comprising only such olefin hydrocarbons. The feeds may contain in addition to the internal unsaturated mono-olefin hydrocarbons such as other polymerizable materials as terminally unsaturated mono-olefin hydrocarbons, di-olefins and tri-olefins and the like. Di-olefins and tri-olefins are to be avoided in the feed, however, since they tend to poison the catalyst useful herein. Further, such non-polymerizable impurities as saturated hydrocarbons, i.e., paraffins and naphthenes may be present in the feedstock.

The base supports useful in the catalysts of the present invention are activated carbons. These activated carbons may be any porous carbon known to be useful for catalysts preparation. The activated carbons generally have surface areas of about 400 to 2000 square meters per gram and may be in the form of compact masses, granules, chips, powders, etc. These include coconut charcoal, wood charcoal, carbon derived from coke, soft bone charcoal, hard bone charcoal, and the like. The activated carbon may be obtained from animal, vegetable or petroleum sources and may include such commercial materials as Pittsburgh "BPL," "CAL," "OL," and "SGL" produced by Pittsburgh Coke and Chemical Co., Girder "G-32-C," and "G-32-E" produced by Chemical Products Division, Chemetron Corp., and Barnebey-Cheney Company's "EE-1" and "E-H-1."

Generally, the amount of cobalt, calculated as cobalt oxide, in the catalyst will be from 0.1 to 50% by weight of the finished catalyst. It is preferred, however, that the amount of cobalt, calculated as cobalt oxide, present in the finished catalyst be 5 to 30% by weight.

The critical feature in the preparation of the catalysts of the present invention is in the activation of the catalyst. Activation will generally be carried out at a temperature in the range of from approximately 400° C. to 575° C. and in a non-oxidizing atmosphere. More often, activation temperatures within the range of 425° C. to 550° C. are used, with the activation carried out in the presence of such non-oxidizing atmospheres as nitrogen, helium, agron and the like. The preferred activation temperatures for the present catalysts are from approximately 450° C. to 525° C. This preferred activation will, of course, take place in the presence of a non-oxidizing atmosphere. The preferred non-oxidizing atmosphere is nitrogen. Activation will generally be carried out for a period of from 0.5 to 5 hours with 1 to 3 hours being somewhat preferred. These periods of time are based upon a previously dried catalyst, and therefore, should the catalyst be wet at the outset of activation, it may be necessary to activate the catalyst for a longer period of ime than above specified. However, such additional time is within the scope of the present invention and is within the ability of these skilled in the art to determine. It, generally, is preferable that the catalyst be dry prior to activation since the possibility of explosion exists in activating a "wet" catalyst.

The method whereby the catalyst of the present invention is prepared is not particularly critical other than as to the above-mentioned activation temperatures. It is only necessary that activated carbon be impregnated with a salt of cobalt prior to activation. The activated carbon may be acid washed or base treated or both prior to impregnation with the salt or cobalt. If the activated carbon is to be acid washed, aqueous nitric acid will most often be used as the acid. This aqueous nitric acid is preferably used in an amount approximately 1 to 2 volumes of acid per volume of activated carbon. Generally, when using an acid wash, it is preferred that the acid be one of a concentration of 10 to 30% in water. If a base treatment is also desired, it will generally be carried out through the use of such liquids as ammonium hydroxide or in some instances gaseous ammonia will suffice for the base treatment. When using a base such as ammonium hydroxide to treat the activated carbon a concentration of 15 to 30% by weight is most often used.

If the activated carbon, which is to be used as the carrier for the catalysts of the present invention, is either base treated or acid treated or both, then it will generally be desired to dry the activated carbon prior to impregnation with the salt of cobalt. This drying step is not necessary to the preparation of the catalyst, however. When the activated carbon is dried at this point, it will generally be dried for 2 to 24 hours or longer at temperatures of from 100 to 150° C. The preparation of the catalyst of the present invention is not to be limited by these drying conditions, however, since as is pointed out above, to dry the catalyst prior to impregnation is not necessary to the catalyst preparation.

The impregnation of the activated carbon with a salt of cobalt may be carried out by any conventional method. Generally, however, the impregnation will be carried out by treating the activated carbon with a solution of a cobalt salt. Among the cobalt salts which may be used for preparing the catalysts of the present invention are the following non-limiting examples: cobalt acetate, cobalt sulfate, cobalt nitrate, cobalt butanoate, cobalt pentanoate, cobalt hexanoate, cobalt ammonium sulfate, cobalt arsenate, cobalt arsenite, cobalt carbonate, cobalt chromate, cobalt vanadate, cobalt molybdate, cobalt iodate, cobalt oxalate, cobalt citrate, cobalt sulfite. The most useful cobalt salts are cobalt acetate, cobalt sulfate and cobalt nitrate in the cobaltous form, with cobalt nitrate being preferred. The cobalt salt solution is preferably an aqueous solution through other solvents for the cobalt salts may be used. The cobalt salt solution is one having a concentration calculated to give the desired amount of cobalt oxide on the carbon when activated. Impregnation may be carried out by immersing the carbon in the cobalt salt solution or by "moistening the carbon" with the solution of cobalt salt.

When impregnation of the activated carbon with the cobalt salt is completed, the catalyst generally will be dried prior to activation. It is not necessary, however, that the catalyst be completely dry prior to activation. The catalyst should be partially dried, however, prior to activation. To attempt to activate a "wet" catalyst is somewhat dangerous since there is a distinct possibility of an explosion due to overly rapid decomposition of the cobalt salt. Relatively complete drying of the catalyst, prior to activation, will be obtained by drying the catalyst from 1 to 24 hours at a temperature of 100–200° C. In drying the catalyst or, for that matter, when drying the activated carbon prior to impregnation, reduced pressure may be used. The use of such reduced pressures is, of course, within the scope of the present invention.

In carrying out the polymerization of internally unsaturated mono-olefin hydrocarbons according to the process of the present invention, temperatures of from approximately 0 to 250° C. generally will be used. It is preferred, however, that the temperature be within the range of from approximately 50 to 200° C. The pressures at which the present invention is carried out range from approximately atmospheric pressure up to 2500 p.s.i.g. and higher. It is preferred, however, that pressures of from 100 to 1000 p.s.i.g. be used. Space velocities of reactants in the present process may range from 0.001 to 20 parts by weight of feed per part by weight of catalyst per hour, but preferably from 0.01 to 10 parts by weight of feed per part by weight of catalyst per hour.

The present invention may be operated as a continuous process or as a batch operation. The equipment useful in either type of operation is well known to those skilled in the art. The present invention is not to be limited to any particular type of equipment since the type of such equipment is not critical. It is only necessary that the equipment follow good engineering principles.

What is claimed is:

1. The process for the polymerization of internally unsaturated acyclic mono-olefin hydrocarbons which comprises contacting such hydrocarbons at a temperature of 0 to 250° C. and a pressure within the range of from approximately atmospheric pressure to 2500 p.s.i.g. with a catalyst comprised of cobalt oxide supported on an activated carbon, said catalyst having been activated in a non-oxidizing atmosphere selected from the group consisting of nitrogen, helium, argon and combinations thereof at a temperature of 400 to 575° C.

2. The process of claim 1 wherein the catalyst contains from 0.1 to 50% by weight of cobalt as cobalt oxide.

3. The process of claim 1 wherein the internally unsaturated acyclic mono-olefin hydrocarbons are of 4 to 20 carbon atoms.

4. The process for the polymerization of internally unsaturated acyclic mono-olefin hydrocarbons which comprises contacting an olefin hydrocarbon feed containing at least one of said internally unsaturated acyclic mono-olefin hydrocarbons at a temperature of 50 to 200° C. and a pressure of 100 to 1000 p.s.i.g. with a catalyst comprised of cobalt oxide supported on an activated carbon, said catalyst having been activated in a non-oxidizing atmosphere selected from the group consisting of nitrogen, helium, argon and combinations thereof at a temperature of 400° C. to 575° C.

5. The process of claim 4 wherein the internally unsaturated acyclic mono-olefin hydrocarbons are 4 to 20 carbon atoms.

6. The process of claim 4 wherein the catalyst contains 0.1 to 50% by weight of cobalt as cobalt oxide.

7. The process of claim 4 wherein the temperature of activation is 425° C. to 550° C.

8. The process of claim 4 wherein the internally unsaturated acyclic mono-olefin hydrocarbons are of 4 to 10 carbon atoms.

9. The process of claim 4 wherein the catalyst contains 5 to 30% by weight of cobalt as cobalt oxide.

10. A method for the preparation of a catalyst suitable for the dimerization of internally unsaturated mono-olefin hydrocarbons, said method comprising impregnating an activated carbon support by contacting said support with a solution of a cobalt salt, drying the cobalt salt impregnated activated carbon and thereafter activating the cobalt salt impregnated carbon in a non-oxidizing atmosphere selected from the group consisting of nitrogen, helium, argon and combinations thereof at a temperature of 400 to 575° C.

11. The method of claim 10 wherein the temperature of activation is 425° C. to 550° C.

12. A catalyst composition comprised of an activated carbon impregnated with an oxide of cobalt, said composition prepared by impregnating an activated carbon with a cobalt salt, and thereafter activating the catalyst in a non-oxidizing atmosphere selected from the group consisting of nitrogen, helium, argon and combinations thereof at a temperature of 400 to 575° C.

References Cited by the Examiner

UNITED STATES PATENTS

| | | | |
|---|---|---|---|
| 2,460,303 | 2/1949 | McAllister et al. | 260—683.15 |
| 2,599,249 | 6/1952 | Friedman | 260—683.15 |
| 2,658,059 | 11/1953 | Peters et al. | 260—683.15 |
| 2,692,261 | 10/1954 | Peters et al. | 260—683.15 |
| 2,692,295 | 10/1954 | Peters | 260—683.15 |

OTHER REFERENCES

Mellor, Comprehensive Treatise on Inorganic and Theoretical Chemistry, vol. 14, Longmans, Green and Co. New York, 1935, pages 584–586.

DELBERT E. GANTZ, *Primary Examiner.*

R. H. SHUBERT, *Assistant Examiner.*